US006966615B2

United States Patent
Kusano et al.

(10) Patent No.: US 6,966,615 B2
(45) Date of Patent: Nov. 22, 2005

(54) HYDRAULIC BRAKING PRESSURE GENERATING APPARATUS FOR A VEHICLE AND A HYDRAULIC BRAKE DEVICE FOR A VEHICLE INCLUDING A HYDRAULIC BRAKING PRESSURE GENERATING APPARATUS

(75) Inventors: Akihito Kusano, Toyota (JP); Satoshi Ishida, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 130 days.

(21) Appl. No.: 10/194,065

(22) Filed: Jul. 15, 2002

(65) Prior Publication Data
US 2003/0030321 A1    Feb. 13, 2003

(30) Foreign Application Priority Data
Jul. 13, 2001    (JP)    .............................. 2001-213183

(51) Int. Cl.[7] .............................................. B60T 8/44
(52) U.S. Cl. ..................................... 303/114.1; 60/550
(58) Field of Search ..................... 303/113.4, 114.1, 303/115.1, 113.3, 11; 60/547.1, 554, 576, 60/550

(56) References Cited

U.S. PATENT DOCUMENTS

| | | | |
|---|---|---|---|
| 4,126,996 A | | 11/1978 | Leiber |
| 4,891,945 A | * | 1/1990 | Becker ....................... 60/547.1 |
| 5,531,509 A | * | 7/1996 | Kellner et al. ........... 303/114.1 |
| 6,052,994 A | * | 4/2000 | Oishi et al. .................... 60/554 |
| 6,062,654 A | | 5/2000 | Becker et al. |
| 6,290,306 B1 | * | 9/2001 | Friedow .................. 303/113.3 |
| 6,367,254 B1 | * | 4/2002 | Takasaki et al. .............. 60/554 |

FOREIGN PATENT DOCUMENTS

| | | |
|---|---|---|
| DE | 197 23 777 | 5/1999 |
| DE | 199 29 154 | 12/2000 |
| JP | 52-101376 | 8/1977 |
| JP | 58-110357 A | 6/1983 |
| JP | 61-37140 B2 | 8/1986 |

* cited by examiner

*Primary Examiner*—Melanie Torres
(74) *Attorney, Agent, or Firm*—Burns, Doane, Swecker & Mathis LLP

(57) ABSTRACT

A hydraulic braking pressure generating apparatus for a vehicle includes a hydraulic pressure generator for generating a predetermined hydraulic pressure irrespective of a braking operation of a brake operation member and for outputting the predetermined hydraulic pressure, an input member moved in response to the brake operation member, a first elastic member for transmitting a brake operation force applied to the input member and for applying a stroke corresponding to the brake operation force to the input member, a regulation valve connecting to the first elastic member and for regulating the outputted hydraulic pressure of the hydraulic pressure generator in response to the brake operation force transmitted through the first elastic member and for outputting a regulated hydraulic pressure and a second elastic member connecting the regulation valve and for urging the regulation valve toward its initial position. A mounting load of the first elastic member is set larger than a mounting load of the second elastic member.

4 Claims, 3 Drawing Sheets

HYDRAULIC BRAKING PRESSURE GENERATING APPARATUS FOR A VEHICLE AND A HYDRAULIC BRAKE DEVICE FOR A VEHICLE INCLUDING A HYDRAULIC BRAKING PRESSURE GENERATING APPARATUS

BACKGROUND OF THE INVENTION

1. Field of the Invention

This invention relates to a hydraulic braking pressure generating apparatus for a vehicle and a hydraulic brake device for a vehicle including the hydraulic braking pressure generating apparatus. Particularly, this invention pertains to a hydraulic braking pressure generating apparatus for a vehicle which regulates an outputted hydraulic pressure of a hydraulic pressure generator and which outputs a regulated hydraulic pressure in response to a braking operation force transmitted through a member functioning as a stroke simulator, and a hydraulic brake device for a vehicle including this hydraulic braking pressure generating apparatus.

2. Description of the Related Art

With respect to a hydraulic braking pressure generating apparatus for a vehicle, various apparatus are known. Particularly, a hydraulic braking pressure generating apparatus for a vehicle which includes a hydraulic pressure generator for generating a predetermined hydraulic pressure irrespective of operation of a brake operation member and for outputting the hydraulic pressure, a member applying a stroke to an input member in response to the brake operation force and functioning as a stroke simulator and a regulation valve for regulating the outputted hydraulic pressure of the hydraulic pressure generator in response to the brake operation force transmitted through the member and for outputting a regulated hydraulic pressure is disclosed, for example, in Japanese patent laid-open publication No. 52(1977)-101376 (Japanese patent publication No. 61(1986)-37140 and Japanese patent laid-open publication No. 58(1983)-110357.

In the apparatus disclosed in the Japanese patent laid-open publication No. 52(1977)-101376, one hydraulic brake circuit is connected to a primary pressure chamber which is positioned at a primary side of a double piston through a branch conduit. An accumulator is disposed at an end surface of a reinforced piston facing to a master cylinder and a separation wall is disposed between the primary pressure chamber and the accumulator. Further, the apparatus disclosed in the Japanese patent laid-open publication No. 58(1983)-110357 pertains to a tandem master cylinder and an auxiliary piston mechanism has an operation face for enabling a detecting of a reaction force of the braking pressure.

In the above prior apparatuses, in case of that a spring for urging the regulation valve toward its initial position is set in such a manner that a load at which the stroke simulator begins to contract is smaller than a load at which the regulation valve begins to move, the regulation valve begins to move after the movement of the input member with a predetermined distance, and then the regulation valve opens and the hydraulic braking pressure is outputted. Therefore, so called idle stroke is increased and a brake feeling deteriorates.

Alternatively, in case of that the load at which the stroke simulator begins to contract is larger than a spring load at which the regulation valve opens, the regulation valve opens and the outputted hydraulic pressure is increased with a predetermined level, and then the input member begins to move. Therefore, a stroke is hardly given to the brake operation member until the outputted hydraulic pressure is increased with the predetermined level and a brake feeling in this time is also not desirable.

SUMMARY OF THE INVENTION

It is an object of the present invention to provide an improved hydraulic braking pressure generating apparatus for a vehicle which shorten the idle stroke as much as possible and which can ensure a good brake feeling.

It is another object of the present invention to provide an improved hydraulic brake device which shorten the idle stroke as much as possible and which can ensure a good brake feeling.

According to a first aspect of the present invention, a hydraulic braking pressure generating apparatus for a vehicle includes a hydraulic pressure generator for generating a predetermined hydraulic pressure irrespective of a braking operation of a brake operation member and for outputting the predetermined hydraulic pressure, an input member moved in response to the brake operation member, a first elastic member for transmitting a brake operation force applied to the input member and for applying a stroke corresponding to the brake operation force to the input member, a regulation valve connecting to the first elastic member and for regulating the outputted hydraulic pressure of the hydraulic pressure generator in response to the brake operation force transmitted through the first elastic member and for outputting a regulated hydraulic pressure and a second elastic member connecting the regulation valve and for urging the regulation valve toward its initial position, wherein a mounting load of the first elastic member is set larger than a mounting load of the second elastic member.

According to a second aspect of the present invention, a hydraulic brake device includes a hydraulic braking pressure generating apparatus for a vehicle which includes a hydraulic pressure generator for generating a predetermined hydraulic pressure irrespective of a braking operation of a brake operation member and for outputting the predetermined hydraulic pressure, an input member moved in response to the brake operation member, a first elastic member for transmitting a brake operation force applied to the input member and for applying a stroke corresponding to the brake operation force to the input member, a regulation valve connecting to the first elastic member and for regulating the outputted hydraulic pressure of the hydraulic pressure generator in response to the brake operation force transmitted through the first elastic member and for outputting a regulated hydraulic pressure and a second elastic member connecting the regulation valve and for urging the regulation valve toward its initial position, and a wheel cylinder for applying a braking force to a wheel in response to the outputted hydraulic pressure of the regulation valve exceeding a predetermined pressure, wherein a mounting load of the first elastic member, a mounting load and a spring constant of the second elastic member are set in such a manner that the mounting load of the first elastic member is larger than the mounting load of the second elastic member and that the outputted hydraulic pressure of the regulation valve at which the first elastic member begins to contract is less than the predetermined pressure.

According to a third aspect of the present invention, a hydraulic brake device includes a hydraulic braking pressure generating apparatus for a vehicle which includes a hydraulic pressure generator for generating a predetermined hydraulic pressure irrespective of a braking operation of a brake operation member and for outputting the predetermined hydraulic pressure, an input member moved in response to the brake operation member, a first elastic member for transmitting a brake operation force applied to the input member and for applying a stroke corresponding to the brake operation force to the input member, a regulation valve connecting to the first elastic member and for regulating the outputted hydraulic pressure of the hydraulic pressure generator in response to the brake operation force transmitted through the first elastic member and for outputting a regulated hydraulic pressure and a second elastic member connecting the regulation valve and for urging the regulation valve toward its initial position, a master cylinder operated by the outputted hydraulic pressure of the regulation valve and a wheel cylinder operated by the outputted hydraulic pressure of the master cylinder and for applying a braking force to a wheel in response to the outputted hydraulic pressure of the master cylinder exceeding a predetermined pressure, wherein a mounting load of the first elastic member, a mounting load and a spring constant of the second elastic member are set in such a manner that the mounting load of the first elastic member is larger than the mounting load of the second elastic member and that the outputted hydraulic pressure of the master cylinder at which the first elastic member begins to contract is less than the predetermined pressure.

BRIEF DESCRIPTION OF THE DRAWINGS

The foregoing and additional features and characteristics of the present invention will become more apparent from the following detailed description considered with reference to the accompanying drawing figures, in which like reference numerals designate like elements.

DESCRIPTION OF THE PREFERRED EMBODIMENTS

Hereinafter, preferred embodiments of the present invention will be described with referent to the drawings.

Figure 1:
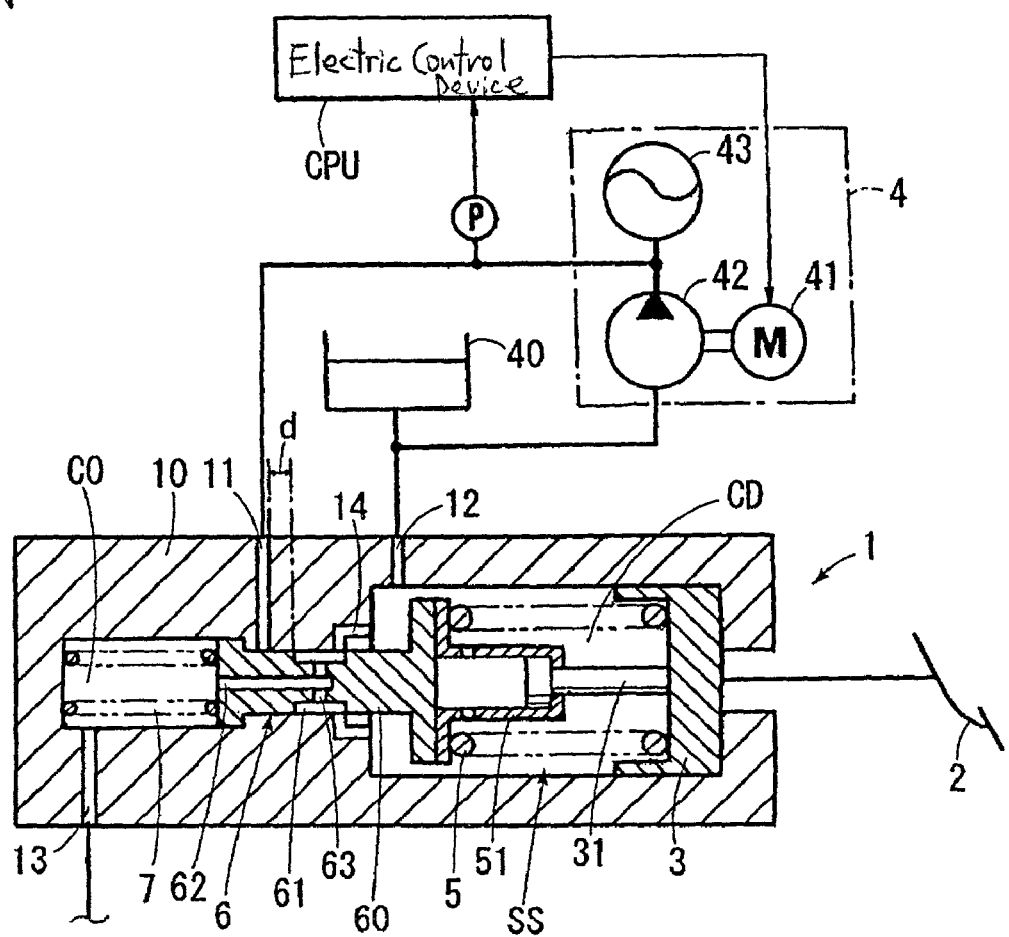
FIG. 1 is a cross sectional view of a hydraulic braking pressure generating apparatus for a vehicle according to one embodiment of the present invention.

FIG. 1 shows a hydraulic braking pressure generating apparatus 1 for a vehicle of one embodiment of the present invention. The apparatus 1 includes a hydraulic pressure generator 4 for generating a predetermined hydraulic pressure irrespective of a braking operation of a brake pedal 2 corresponding to a brake operation member and for outputting the predetermined hydraulic pressure. The hydraulic pressure generator 4 of the embodiment includes an electric motor 41 controlled by an electric control device CPU and a hydraulic pump 42 driven by the electric motor 41. An input side of the hydraulic pump 42 is connected to a reservoir 40 and an output side thereof is connected to an accumulator 43. In this embodiment, a pressure sensor P is connected to the output side and the detected pressure of the pressure sensor P is monitored by the electric control device CPU. The electric motor 41 is controlled by the electric control device CPU on the basis of the monitoring result so that the hydraulic pressure of the accumulator 43 is maintained between a predetermined upper limit value and a predetermined lower limit value.

On the other hand, in a cylinder 10 to which the hydraulic pressure generator 4 is connected, an input member 3 which is moved in response to the operation of the brake pedal 2 is accommodated therein and a coil spring 5 is accommodated therein as a first elastic member for transmitting a brake operation force applied to the input member 3 and for applying a stroke corresponding to the brake operation force to the input member 3. Thereby, a stroke simulator is constituted by the input member 3 and the coil spring 5 (In FIG. 1, the stroke simulator is shown as SS). Further, in the cylinder 10, a regulation valve 6 for regulating the outputted hydraulic pressure of the hydraulic pressure generator 4 in response to the brake operation force transmitted through the coil spring 5 and for outputting a regulated hydraulic pressure is accommodated therein and is disposed coaxially with the input member 3. Further, a coil spring 7 is accommodated in the cylinder 10 as a second elastic member for urging the regulation valve 6 toward its initial position and is located in front of the regulation valve 6. FIG. 1 is a view showing a frame format of the components. For example, in fact, it is necessary that the cylinder 10 is divided into a plurality of parts in consideration of the assembling and so on. However, since this division of the parts is a designing matter, the cylinder 10 is shown as a single part in FIG. 1 as a matter of convenience for the description.

In the cylinder 10, an output pressure chamber CO and a drain chamber CD are formed back and forth of the regulation valve 6. The input member 3 and the coil spring 5 are accommodated in the output pressure chamber CO and the coil spring 7 is accommodated in the drain chamber CD. A plunger 31 is integrally formed on the input member 3. A retainer 51 which regulates the backward movement of the plunger 31 is disposed so as to contact with the regulation valve 6. The coil spring 5 is interposed between the regulation valve 6 and the input member 3 through the retainer 51. The coil spring 5 constitutes the first elastic member as mentioned above and functions as the stroke simulator. The first elastic member is not limited to the coil spring and rubber, air spring and so on can be used as the first elastic member.

Further, an inlet port 11 which communicates with the output pressure chamber CO through the regulation valve 6, a drain port 12 which communicates with the drain chamber CD, an outlet port 13 which communicates with the output pressure chamber CO and a communication hole which communicates between the output pressure chamber CO and the drain chamber CD through the regulation valve 6 are formed on the cylinder 10. The output side of the hydraulic pressure generator 4 is communicated with the inlet port 11 of the cylinder 10 through a check valve (not shown). The input side of the hydraulic pressure generator 4 is communicated with the reservoir 40 and the drain port 12 of the cylinder 10.

The regulation valve 6 of the embodiment is constituted by a spool valve. A circular groove 61 is formed on the outer circumference of a spool 60. An axial hole 62 which is opened forwardly is formed on the spool 60 and is communicated with the circular groove 61 through a radial communicating hole 63. Large diameter portions are formed on the front end portion and the rear end portion of the spool 6. The front end portion of the spool 6 is supported so as to be able to move in the output pressure chamber CO. The front end portion is engaged with a stepped portion of a rear end of the output pressure chamber CO and the rearward movement of the spool 60 is regulated. Accordingly, since the regulation valve 6 is urged rearward by the coil spring 7 of the second elastic member, as shown in FIG. 1, the front end portion of the spool 60 is pressed onto the stepped portion of the rear end of the output pressure chamber CO under the non operational condition of the regulation valve 6. In this condition, the circular groove 61 of the spool 60 is opposite to the communication hole 14 and the output pressure chamber CO is communicated to the drain chamber CD through the axial hole 62, the radial communicating hole 63, the circular groove 61 and the communication hole 14. Accordingly, the hydraulic braking pressure generating apparatus 1 is in a condition in which the output is decreased. In this condition, the inlet port 11 is interrupted by the spool 60.

When the spool 60 is moved frontward and is in a position at which the circular groove 61 does not communicate to the communication hole 61 and the inlet port 11, the communication between the output pressure chamber CO and the drain chamber CD is interrupted and the output pressure chamber CO does not also communicate to the inlet port 11. Since the output pressure chamber CO communicates only to the outlet port 13, the hydraulic pressure which is leaded from the output pressure chamber CO to the communicating partner of the outlet port 13 is held and the hydraulic braking pressure generating apparatus 1 is in a condition in which the output is held. When the spool 60 is further moved frontward and the circular groove 61 communicates to the inlet port 11 (in this time, the circular groove 61 does not communicate to the communicating hole 14), since the output pressure chamber CO communicates to the hydraulic pressure generator 4 through the axial hole 62, the radial communicating hole 63, the circular groove 61 and the inlet port 11, the outputted hydraulic pressure of the hydraulic pressure generator 4 is supplied to the output pressure chamber CO and the hydraulic braking pressure generating apparatus 1 is in a condition in which the output is increased.

The forward urging force of the coil spring 5 and the backward urging force of the coil spring 7 are applied to the regulation valve 6. The mounting load F1 of the coil spring 5 and the mounting load F2 of the coil spring 7 is set such that a load for beginning to move applied to the input member 3 by the start of the contraction of the coil spring 5 becomes larger than a load at which the regulation valve 6 begins to move. Namely, the mounting load F1 of the coil spring 5 is set larger than the mounting load F2 of the coil spring 7 (F1>F2). Further, the load for beginning to move applied to the input member 3 by the start of the contraction of the coil spring 5 is set smaller than a load at which the regulation valve 6 opens. Namely, the sum between the mounting load F2 of the coil spring 7 and the product (k2·d) of the idle stroke d (hereinafter, stroke d) of the spool 60 and the spring constant k2 of the coil spring 7 is set larger than the mounting load F1 of the coil spring 5 [F1<(F2+k2·d)].

Next, the operation of the hydraulic pressure generator 4 is described. Firstly, when the brake pedal 2 is not operated, the input member 3 and the regulation valve 6 are in the condition shown in FIG. 1. Namely, the front end portion of the spool 60 is engaged with the stepped portion of the rear end of the output pressure chamber CO by the urging force of the coil spring 7. In this time, since the plunger 31 is engaged with the retainer 51 by the urging force of the coil spring 5, the inlet port 11 is interrupted by the outer circumferential wall of the spool 60 in the condition shown in FIG. 1. On the contrary, the circular groove 61 of the spool 60 is opposite to the communicating hole 14 and the output pressure chamber CO is communicated to the drain chamber CD through the axial hole 62, the radial communicating hole 63, the circular groove 61 and the communication hole 14 (output decreasing condition). The output pressure chamber CO and the drain chamber CD are communicated to the reservoir 40 and are under the approximately atmosphere pressure. The outputted hydraulic pressure of the hydraulic pressure generator 4 is not supplied to the output pressure chamber CO and therefore the hydraulic braking pressure generating apparatus 1 is maintained at the initial position shown in FIG. 1.

When the depression force is applied to the brake pedal 2, since the mounting load F1 of the coil spring 5 is set larger than the mounting load F2 of the coil spring 7 (F1>F2), the spool 60 of the regulation valve 6 moves frontward while the coil spring 7 is compressed. When the depression force is further applied to the brake pedal 2 against to the urging force of the coil spring 7 and the spool 60 moves further frontward, the spool 60 is in the position at which the circular groove 61 does not communicate to the communication hole 14 and the inlet port 11 and the hydraulic braking pressure generating apparatus 1 is in the condition in which the output is held.

When the depression force is further applied to the brake pedal 2 and the spool 60 moves further frontward, the communication hole 14 is interrupted and the circular groove 61 communicates to the inlet port 11, and the regulation valve 6 opens. Namely, since the sum between the mounting load F2 of the coil spring 7 and the product (k2·d) of the stroke d of the spool 60 and the spring constant k2 of the coil spring 7 is set larger than the mounting load F1 of the coil spring 5 [F1<(F2+k2·d)], the coil spring 5 is compressed before the regulation valve 6 opens and the function as the stroke simulator is started. When the regulation valve 6 opens, the outputted hydraulic pressure of the hydraulic pressure generator 4 is supplied to the output pressure chamber CO as mentioned above and the hydraulic braking pressure generating apparatus 1 is in the condition in which the output is increased.

When the brake pedal 2 is operated in the output decreasing condition shown in FIG. 1, the outputted hydraulic pressure of the hydraulic pressure generator 4 is decreased to a pressure corresponding to the force transmitted from the input member 3 to the spool 60 through the coil spring 5 by the regulation valve 6 and is regulated. Thereby, the hydraulic pressure corresponding to the brake operation force is outputted from the output pressure chamber CO. Simultaneously, the coil spring 5 is compressed and the stroke corresponding to the brake operation force is applied to the input member 3 and the brake pedal 2, and the function as the stroke simulator is carried out.

Figure 2:
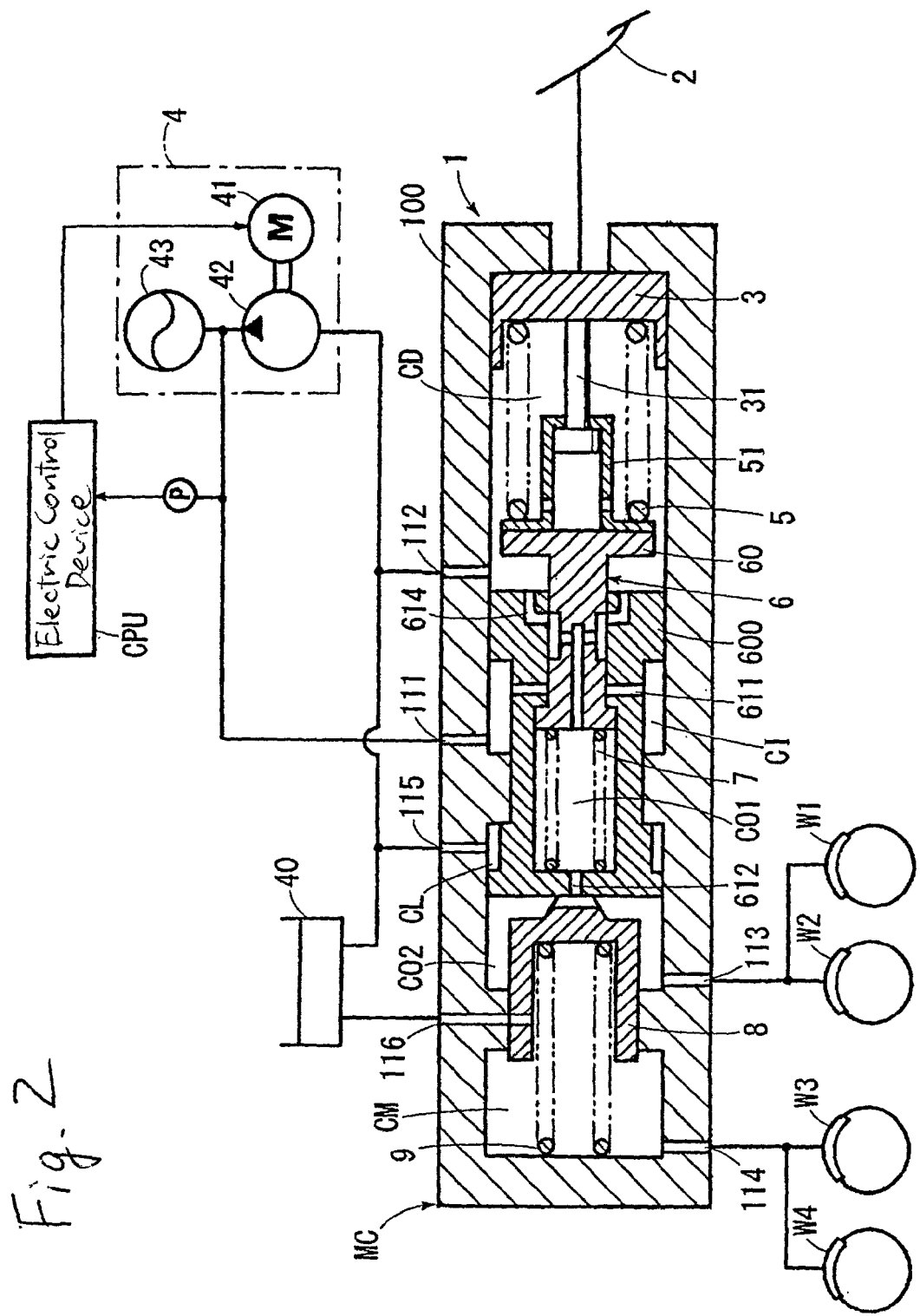
FIG. 2 is a cross sectional view of a hydraulic brake device for a vehicle according to one embodiment of the present invention.

FIG. 2 shows a hydraulic brake device of one embodiment of the present invention. The device includes the hydraulic braking pressure generating apparatus 1 shown in FIG. 1. A master cylinder MC and wheel cylinders W1 to W4 are added to the hydraulic braking pressure generating apparatus 1. In the hydraulic brake device of this embodiment, the master cylinder MC which is operated by the outputted pressure of the regulation valve 6 is provided. One hydraulic system which is connected to the wheel cylinders W1 and W2 is constituted so as to be directly driven by the outputted pressure of the regulation valve 6 and the other hydraulic system which is connected to the wheel cylinders W3 and W4 is connected to the master cylinder MC.

In FIG. 2, a cylinder 100 is provided as a substitute for the cylinder 10. A inlet port 111, a drain port 112, outlet ports 113 and 114 and low pressure ports 115 and 116 are formed on the cylinder 100. A cylinder 600 which is a tube member and which constitutes a housing of the regulation valve 6 is accommodated in the cylinder 100 so as to be able to slide. An input pressure chamber CI and a low pressure chamber CL are formed between the inner circumferential surface of the cylinder 100 and the outer circumferential surface of the cylinder 600 and an output pressure chamber CO1 is formed in the cylinder 600. Further, a communication hole 611 which communicates to the input pressure chamber CI is formed on the cylinder 600 and the communication hole 611 is communicated to the inlet port 111 through the input pressure chamber CI. The output pressure chamber CO1 in the cylinder 600 is communicated to an output pressure chamber CO2 in the cylinder 100. The low pressure chamber CL is communicated to the reservoir 40 through the low pressure port 115.

If the hydraulic pressure generator 4 is normal, the outputted pressure thereof is supplied to the input pressure chamber CI and the cylinder 600 is held in the initial position shown in FIG. 2. When the hydraulic pressure generator 4 fails and the outputted pressure thereof disappears, the holding of the cylinder 600 is released and is in a condition in which the cylinder 600 can slide.

A master cylinder piston 8 is accommodated in the cylinder 100 so as to be able to slide and the master cylinder MC is disposed such that the rear end of the master piston 8 contacts with the front end of the cylinder 600 by the coil spring 9. A master pressure chamber CM is formed in front of the master piston 8 and the output pressure chamber CO2 is formed in the rear of the master piston 8. The master pressure chamber CM is communicated to or interrupted from the low pressure port 116 by the skirt portion of the master piston 8 in response to the sliding movement of the master piston 8. As mentioned above, the output pressure chamber CO2 is connected to the wheel cylinders W1 and W2 through the outlet port 113 and the master pressure chamber CM is connected to the wheel cylinders W3 and W4 through the outlet port 114. In this embodiment, the summation of the mounting load F2 of the coil spring 7, the product (k2·d) of the stroke d of the spool 60 and the spring constant k2 of the coil spring 7, and the product (A·Po) of a predetermined pressure Po in the output pressure chambers CO1 and CO2 and the effective cross section A of the spool 60 is set larger than the mounting load F1 of the coil spring 5 [F1<(F2+k2·d+A·Po)]. The predetermined pressure Po is a pressure at which the wheel cylinders W1 and W2 begin to generate the braking force to wheels. The other structures are substantially same as the structures of FIG. 1. Therefore, same numerals are used and the description is omitted.

In the above hydraulic brake device, FIG. 2 shows a condition in which the hydraulic pressure generator 4 is normal and in which the brake pedal 2 is not operated. In this condition, the outputted pressure of the regulation valve 6 is supplied from the output pressure chamber CO2 to the wheel cylinders W1 and W2 and one hydraulic system is directly driven by the outputted pressure of the regulation valve 6. The other hydraulic system connected to the wheel cylinders W3 and W4 is communicated to the master cylinder MC. Therefore, when the force for driving the master piston 8 frontward by the outputted pressure of the regulation valve 6 exceeds the resistance force such as the mounting load of the coil spring 9 and so on, the brake pressure is supplied from the master pressure chamber MC to the wheel cylinders W3 and W4 in response to the outputted pressure of the regulation valve 6 and the braking force is applied to the wheels. In this time, since the above relationship [F1<(F2+k2·d+A·Po)] is set, the coil spring 5 is compressed before the wheel cylinders W1 and W2 begin to generate the braking force to the wheels and the function as the stroke simulator is started.

Figure 3:
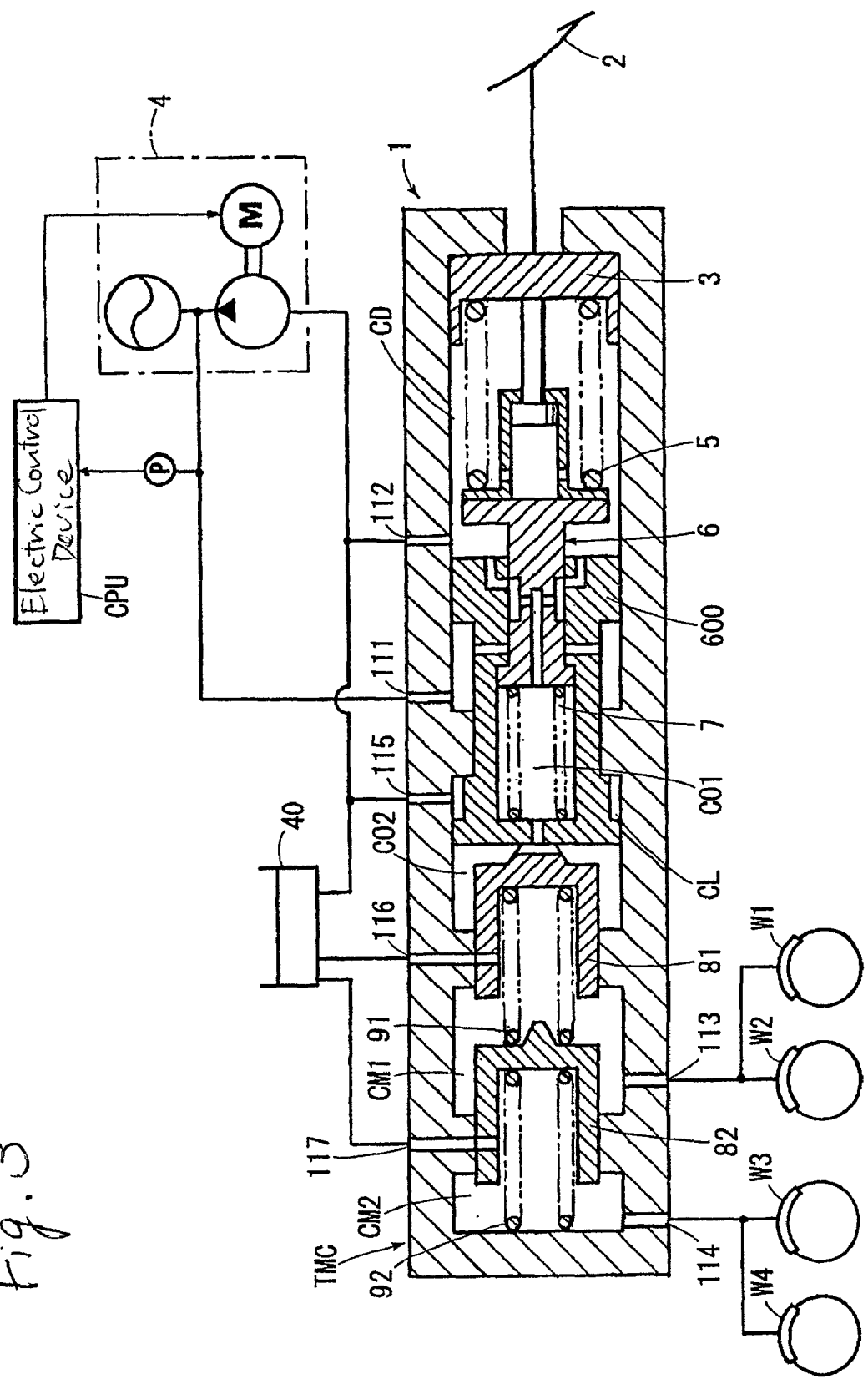
FIG. 3 is a cross sectional view of a hydraulic brake device for a vehicle according to another embodiment of the present invention.

In the unlikely event of the fail of the hydraulic pressure generator 4, the outputted pressure of the hydraulic pressure generator 4 is not supplied to the output pressure chambers CO1 and CO2. Accordingly, when the input member 3 is driven frontward by the operation of the brake pedal 2, the spool 60 moves frontward against to the urging force of the coil spring 7 and the input member 3 moves frontward against to the urging force of the coil spring 5, and the rear end portion of the spool 60 is contacted with the rear end surface of the cylinder 600. When the input member 3 moves further frontward, the top end of the plunger 31 contacts with the rear end of the spool 60. In this time, the regulation valve 6 is in a condition that the output is increased and the brake fluid is prevented from retuning to the hydraulic pressure generator 4 by a check valve (not shown). Thereby, the operation force of the brake pedal 2 is directly transmitted to the cylinder 600 and the master piston 8 and as a result, the brake pressure is outputted from the output pressure chamber CO2 to the wheel cylinders W1 and W2. Simultaneously, the brake pressure is outputted from the master pressure chamber CM to the wheel cylinders W3 and W4. FIG. 3 shows a hydraulic brake device of another embodiment of the present invention. The device includes the hydraulic braking pressure generating apparatus 1 shown in FIG. 1. A tandem master cylinder TMC is added to the hydraulic braking pressure generating apparatus 1. Namely, in this embodiment, the tandem master cylinder TMC which is operated by the outputted pressure of the regulation valve 6 is provided and the tandem master cylinder TMC includes master pistons 81, 82 and coil springs 91, 92. One hydraulic system connected to the wheel cylinders W1 and W2 is connected to the master pressure chamber CM1 and the other hydraulic system connected to the wheel cylinders W3 and W4 is connected to the master pressure chamber CM2. The master pressure chamber CM2 is communicated to the reservoir 40 through a port 117. Output pressure chambers CO1 and CO2 are auxiliary pressure chambers and are not communicated to the wheel cylinders W1 and W2. Therefore, it is not necessary to provide the above mentioned check valve on the output side of the hydraulic pressure generator 4. The other structures are substantially same as the structures of FIG. 2. Therefore, same numerals are used and the description is omitted.

Particularly, in this embodiment, differing from the embodiments shown in FIG. 1 and FIG. 2, a load at which the coil spring 5 begins to contract is larger than a load at which the regulation valve opens. Namely, the sum between the mounting load F2 of the coil spring 7 and the product (k2·d) of the stroke d of the spool 60 and the spring constant k2 of the coil spring 7 is set larger than the mounting load F1 of the coil spring 5 [F1>(F2+k2·d)]. The following is the reason of the this relationship. Since the operation of the master pistons 81 and 82 of the tandem master cylinder TMC tend to be delayed by the sliding resistance and so on with respect to the operation of the regulation valve 6, it is desirable that the regulation valve 6 opens in advance when the coil spring 5 begins to contract. In this embodiment, the following relationship is set. F1<(F2+k2·d+A·P1) The hydraulic pressure Po is a hydraulic pressure of the master pressure chamber CM1 at which the wheel cylinders W1 and W2 begins to generate the braking force to the wheels. The hydraulic pressure P1 is a hydraulic pressure of the output pressure chambers CO1 and CO2 at which the hydraulic pressure of the master pressure chamber CM1 is the pressure Po. As mentioned above, according to the present invention, it is able to shorten the idle stroke and it is able to ensure the good brake feeing.

We claim:

1. A hydraulic braking pressure generating apparatus for a vehicle comprising:

a hydraulic pressure generator for generating a predetermined hydraulic pressure irrespective of a braking operation of a brake operation member and for outputting the predetermined hydraulic pressure, an input member moved in response to the brake operation member, a first elastic member for transmitting a brake operation force applied to the input member and for applying a stroke corresponding to the brake operation force to the input member, a regulation valve for regulating the outputted hydraulic pressure of the hydraulic pressure generator in response to the brake operation force transmitted through the first elastic member and for outputting a regulated hydraulic pressure, a second elastic member for urging the regulation valve toward its initial position, wherein a mounting load of the first elastic member is set larger than a mounting load of the second elastic member; and wherein the spring constant of the second elastic member is set such that the mounting load of the first elastic member is smaller than a load of the second elastic member at which the regulation valve opens.

2. A hydraulic brake device comprising:

a hydraulic braking pressure generating apparatus for a vehicle which includes a hydraulic pressure generator for generating a predetermined hydraulic pressure irrespective of a braking operation of a brake operation member and for outputting the predetermined hydraulic pressure, an input member moved in response to the brake operation member, a first elastic member for transmitting a brake operation force applied to the input member and for applying a stroke corresponding to the brake operation force to the input member, a regulation valve for regulating the outputted hydraulic pressure of the hydraulic pressure generator in response to the brake operation force transmitted through the first elastic member and for outputting a regulated hydraulic pressure and a second elastic member for urging the regulation valve toward its initial position, a master cylinder operated by the outputted hydraulic pressure of the regulation valve, the master cylinder being divided into plural respective output pressure chambers by a piston, and a plurality of wheel cylinders operated by the outputted hydraulic pressure of the respective output pressure chambers of the master cylinder and for applying a braking force to wheels in response to the outputted hydraulic pressure of the respective output pressure chambers of the master cylinder exceeding a predetermined pressure, wherein a mounting load of the first elastic member, a mounting load and a spring constant of the second elastic member are set in such a manner that the mounting load of the first elastic member is larger than the mounting load of the second elastic member and that the outputted hydraulic pressure of the master cylinder at which the first elastic member begins to contract is less than the predetermined pressure.

3. A hydraulic brake apparatus for a vehicle according to claim 2, wherein the spring constant of the second elastic member is set such that the mounting load of the first elastic member is larger than a load of the second elastic member at which the regulation valve opens.

4. A hydraulic brake device according to claim 2, further comprising:

a slidable cylinder accommodating the regulation valve; and wherein the piston contacts an end of the slidable cylinder.

* * * * *